(12) United States Patent
Ko

(10) Patent No.: US 7,990,634 B2
(45) Date of Patent: Aug. 2, 2011

(54) LENS MODULE WITH GROOVED BARREL

(75) Inventor: Chun-Cheng Ko, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/648,044

(22) Filed: Dec. 28, 2009

(65) Prior Publication Data
US 2011/0002056 A1    Jan. 6, 2011

(30) Foreign Application Priority Data
Jul. 3, 2009 (CN) .......................... 2009 1 0303971

(51) Int. Cl.
*G02B 7/02* (2006.01)
(52) U.S. Cl. ........................................ 359/823; 359/829
(58) Field of Classification Search .................. 359/823, 359/825, 827, 829
See application file for complete search history.

(56) References Cited

U.S. PATENT DOCUMENTS
2009/0251805 A1 *  10/2009  Wu .............................. 359/823
* cited by examiner

*Primary Examiner* — Alicia Harrington
(74) *Attorney, Agent, or Firm* — Raymond J. Chew

(57) ABSTRACT

An exemplary lens module includes a substrate, a housing, a carrier, and a barrel. The housing is hollow, and disposed on the substrate. The carrier is received in the housing. The carrier defines a through hole. The barrel is received in the housing. The barrel includes a receiving body, a focusing portion, a connection portion, and a groove. The focusing portion is at a top end of the receiving body. The connection portion is at a bottom end of the receiving body. The groove spans from the top end of the receiving body to the connection body. The receiving body is received in the through hole of the carrier. The connection portion is mechanically connected to the carrier. A top end of the connection portion is exposed by the groove.

7 Claims, 3 Drawing Sheets

LENS MODULE WITH GROOVED BARREL

BACKGROUND

1. Technical Field

The present disclosure relates to lens modules and, particularly, to a lens module of an imaging device such as a digital camera.

2. Description of Related Art

Generally, imaging devices such as digital cameras includes lens modules for picking up images. Commonly, a lens module includes a housing, a carrier received in the housing, a barrel rotatably received in the carrier, and lenses received in the barrel. In manufacturing of a lens module, a focusing tool drives the barrel to move relative to the carrier, in order to focus the lenses. After focusing, glue is dispensed in drops between the carrier and the barrel to fix the carrier with the barrel, so that the camera can automatically focus by driving the carrier and the barrel to move together. However, if a clearance between the carrier and barrel is too small, the glue may overflow from the space between the carrier and the housing and cause the barrel to adhere to the housing. When this happens, the carrier cannot move together with the barrel for focusing the lenses.

Therefore, it is desirable to provide a lens module of an imaging device such as a digital camera which can overcome or at least alleviate the above-mentioned problems.

DETAILED DESCRIPTION

Embodiments of the disclosure will now be described in detail with reference to the accompanying drawings.

Figure 1:
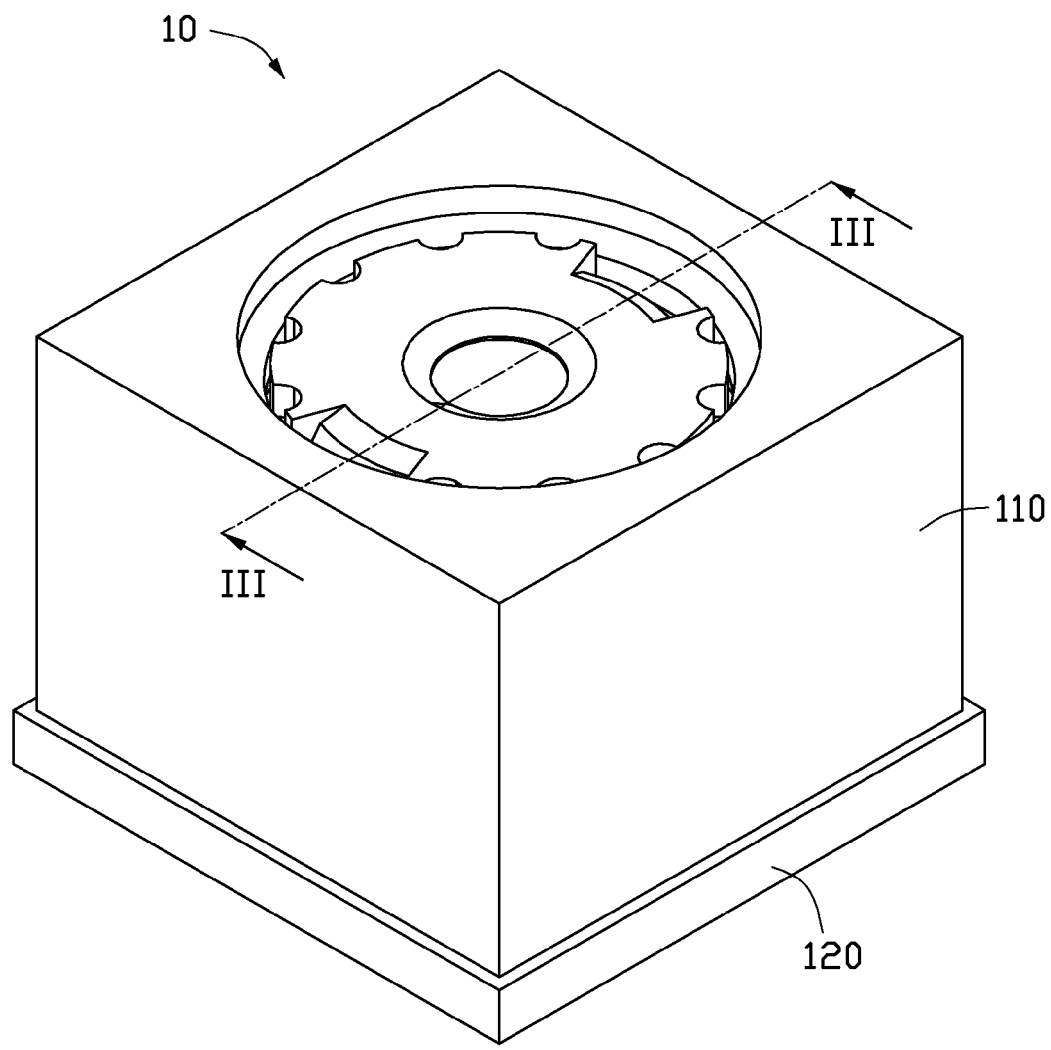
FIG. 1 is a schematic, isometric view of a lens module according to an exemplary embodiment.
Figure 2:
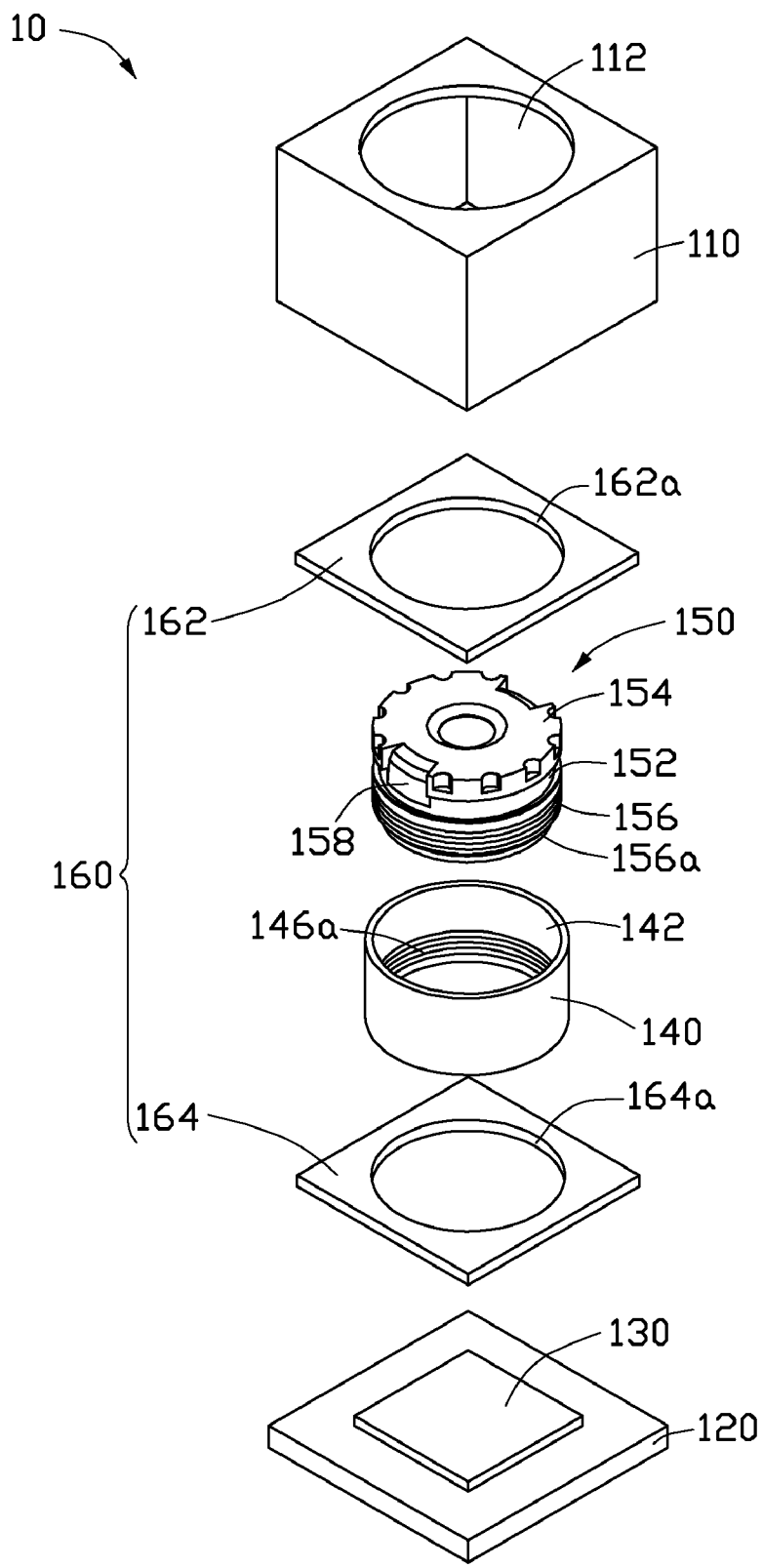
FIG. 2 is an exploded view of the lens module of FIG. 1.

Referring to FIGS. 1 and 2, these show a lens module 10 according to an exemplary embodiment. The lens module 10 is for an imaging device such as a digital camera. The lens module 10 includes a housing 110, a substrate 120, an imaging sensor 130, a carrier 140, a barrel 150, and a restriction mechanism 160. The housing 110 is hollow, and is disposed on the substrate 120. A top wall of the housing 110 defines a first through hole 112. The imaging sensor 130, the carrier 140, the barrel 150, and the restriction mechanism 160 are received in the housing 110.

The imaging sensor 130 is mechanically and electrically connected to the substrate 120. The imaging sensor 130 can be a charge coupled device (CCD) or a complementary metal oxide semiconductor (CMOS).

The carrier 140 defines a second through hole 142. When the lens module 10 is applied in an imaging device such as a digital camera, the carrier 140 is electrically connected to a driver (not shown). The carrier 140 is driven by the driver to move along an optical axis direction of the barrel 150. An inner thread portion 146a is formed on an inner sidewall of the carrier 140 which bounds the second through hole 142.

Figure 3:
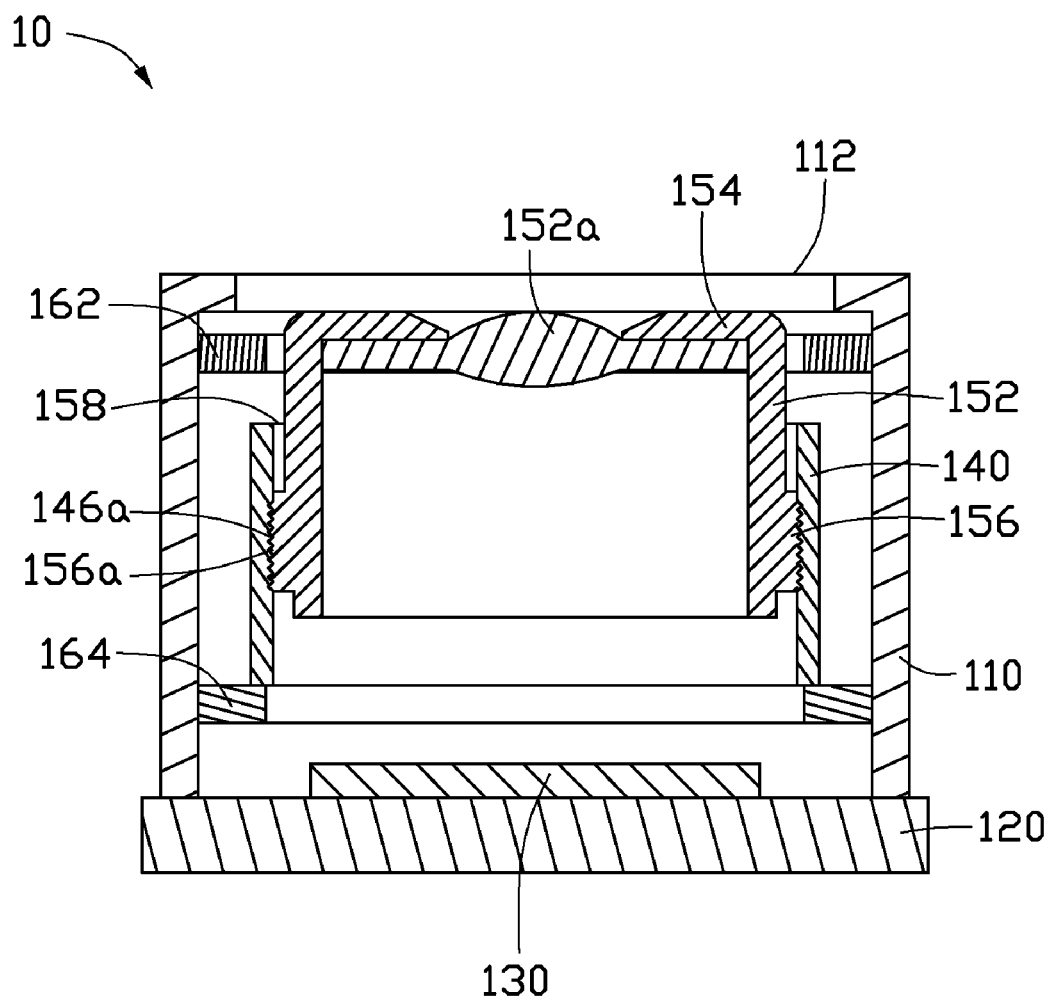
FIG. 3 is a cross-sectional view of the lens module of FIG. 1 taken along the line III-III thereof.

Referring also to FIG. 3, the barrel 150 includes a receiving body 152, a focusing portion 154, and a connection portion 156. The focusing portion 154 and the connection portion 156 are disposed at two opposite ends of the receiving body 152, respectively. The receiving body 152 is received in the second through hole 140 and configured for receiving a lens 152a. An outer thread portion 156a is formed on the outer surface of the connection portion 156, corresponding to the inner thread portion 146a. The receiving body 152 is secured to the carrier 140 by the outer thread portion 156a threadedly mating with the inner thread portion 146a of the carrier 140. The barrel 150 defines a pair of grooves 158 at opposite sides of a top end thereof. Each of the grooves 158 spans down to the connection portion 156. After the barrel 150 is screwed into the carrier 140, each groove 158 is positioned between a body of the barrel 150 and the carrier 140. Thus, part of a protruding top annular step surface of the connection portion 156 is exposed by each groove 158.

The restriction mechanism 160 includes a first restriction portion 162 and a second restriction portion 164 corresponding to the first restriction portion 162. The first and second restriction portions 162, 164 are received in the housing 110, and are mounted on an inner sidewall of the housing 110. The first restriction portion 162 is far away from the substrate 120 and the second restriction portion 164 is close to the substrate 120. In this embodiment, the first and second restriction portions 162, 164 are both square. A third and a fourth through holes 162a, 164a are defined in the middle of the first and second restriction portions 162, 164, respectively.

In manufacturing of the lens module 10, the focusing portion 154 of the barrel 150 is rotated by a focusing tool (not shown), whereby the outer thread portion 156a of the barrel 150 is rotated along the inner thread portion 146a of the carrier 140 for focusing the lens 152a. After focusing, glue (adhesive) is dispensed in drops into the grooves 158 by a glue dispensing device (not shown). Typically, the glue seeps into a small clearance (gap) between the outer thread portion 156a and the inner thread portion 146a, and thereby the carrier 140 is firmly secured to the barrel 150. Then when the lens module 10 is applied in an imaging device such as a digital camera, the driver (not shown) can drive the carrier 140 and the barrel 150 to move together for automatically focusing in the digital camera.

When the clearance between the inner thread portion 146a of the carrier 140 and the outer thread portion 156a of the barrel 150 is very small, the grooves 158 can prevent the glue from overflowing to locations between the barrel 150 and the housing 110, or between the barrel 150 and the first restriction portion 162, or between the barrel 150 and the second restriction portion 164. This helps prevent the carrier 140 from being erroneously secured to the housing 110, the first restriction portion 162, or the second restriction portion 164. Thus, in use of the lens module 10, the carrier 140 can freely move in unison with the barrel 150 between the first restriction portion 162 and the second restriction portion 164 in the housing 110.

It is to be understood, however, that even though numerous characteristics and advantages of various embodiments have been set forth in the foregoing description, together with details of the structures and functions of the embodiments, the disclosure is illustrative only; and that changes may be made in detail, especially in matters of shape, size and arrangement of parts within the principles of the invention to the full extent indicated by the broad general meaning of the terms in which the appended claims are expressed.

What is claimed is:

1. A lens module comprising:
   a substrate;
   a hollow housing disposed on the substrate;
   a carrier received in the housing and defining a through hole;
   a restriction mechanism comprising a first restriction portion received in the housing away from the substrate and a second restriction portion received in the housing close to the substrate, the first restriction portion and the second restriction portion both being mounted on an inner sidewall of the housing; and a barrel received in the housing and comprising a receiving body, a focusing portion, a connection portion, and a groove, wherein the focusing portion is at a top end of the receiving body, the connection portion is at a bottom end of the receiving body, the groove spans from the top end of the receiving body to the connection portion, the receiving body is received in the through hole of the carrier, the connection portion is mechanically connected to the carrier, and a top end of the connection portion is exposed by the groove.

2. The lens module of claim 1, further comprising an imaging sensor disposed on the substrate.

3. The lens module of claim 1, wherein an outer surface the connection portion defines an outer thread screw portion, and the inner sidewall of the through hole defines an inner thread screw portion corresponding to the outer thread screw portion, and the connection portion is connected to the carrier by the outer thread screw portion of the connection portion threadedly mating with the inner thread screw portion of the carrier.

4. The lens module of claim 1, wherein the restriction mechanism is configured for restricting movement of the carrier.

5. The lens module of claim 1, wherein the first restriction portion is substantially square.

6. The lens module of claim 1, wherein the second restriction portion is substantially square.

7. A lens module comprising:
a substrate;
a hollow housing attached on the substrate;
a carrier received in the housing and defining a through hole;
a restriction mechanism comprising a first restriction portion received in the housing away from the substrate and a second restriction portion received in the housing close to the substrate, the first restriction portion and the second restriction portion both being mounted on an inner sidewall of the housing; and
a barrel received in the housing and comprising an outer wall and a screw thread portion, the screw thread portion protruding from the outer wall, the outer wall defining a groove spanning from an end of the barrel at an object side of the lens module to the screw thread portion, the barrel received in the trough hole of the carrier with the screw thread portion threadedly engaged in the carrier, and a part of the screw thread portion exposed at the end of the barrel by the groove.

\* \* \* \* \*